3 Sheets--Sheet 2.

SIDNEY SKILLMAN.
Dummy Engine.

No. 123,367. Patented Feb. 6, 1872.

Witnesses: A. J. Hoermann. L. C. Livings.

Inventor: S. Skillman
By his attorneys

SIDNEY SKILLMAN. Dummy Engine.

No. 123,367.

3 Sheets--Sheet 3.

Patented Feb. 6, 1872.

Witnesses,

Inventor,
Sidney Skillman 123,367

UNITED STATES PATENT OFFICE.

SIDNEY SKILLMAN, OF JERSEY CITY, ASSIGNOR TO HIMSELF AND HUMPHREY B. DUNHAM, OF NEWARK, NEW JERSEY.

IMPROVEMENT IN LOCOMOTIVE-ENGINES.

Specification forming part of Letters Patent No. 123,367, dated February 6, 1872.

*To all whom it may concern:*

Be it known that I, SIDNEY SKILLMAN, of Jersey City, in the county of Hudson and State of New Jersey, have invented certain new and useful Improvements in Locomotive-Engines, of which the following is a specification:

Some part of my invention is applicable only to that class of engines known as dummies. I will describe it as so applied.

It is very important, in the principal purposes for which dummy-engines are employed, to be able to surmount considerable grades, even at a great consumption of steam; and it is also desirable to be able to run with economy upon the level and upon the descending portions of the road. My invention provides for this by novel and very efficient means. It is important that the work be as compactly put together as may be, and at the same time allow convenient access to all the parts for cleaning, oiling, and repairs. My invention provides for this by a novel arrangement of the parts, in which one of the chief features is the placing of the guides or slides in or over the space between the driving-wheels. I make the house or protecting covering over the whole structure easily removable, and I provide very simply and efficiently for facilitating the turning of the structure on short curves and the distribution of the weight on a long wheel base.

The following is a description of what I consider the best means of carrying out the invention:

The accompanying drawing forms a part of this specification.

Figure 1:
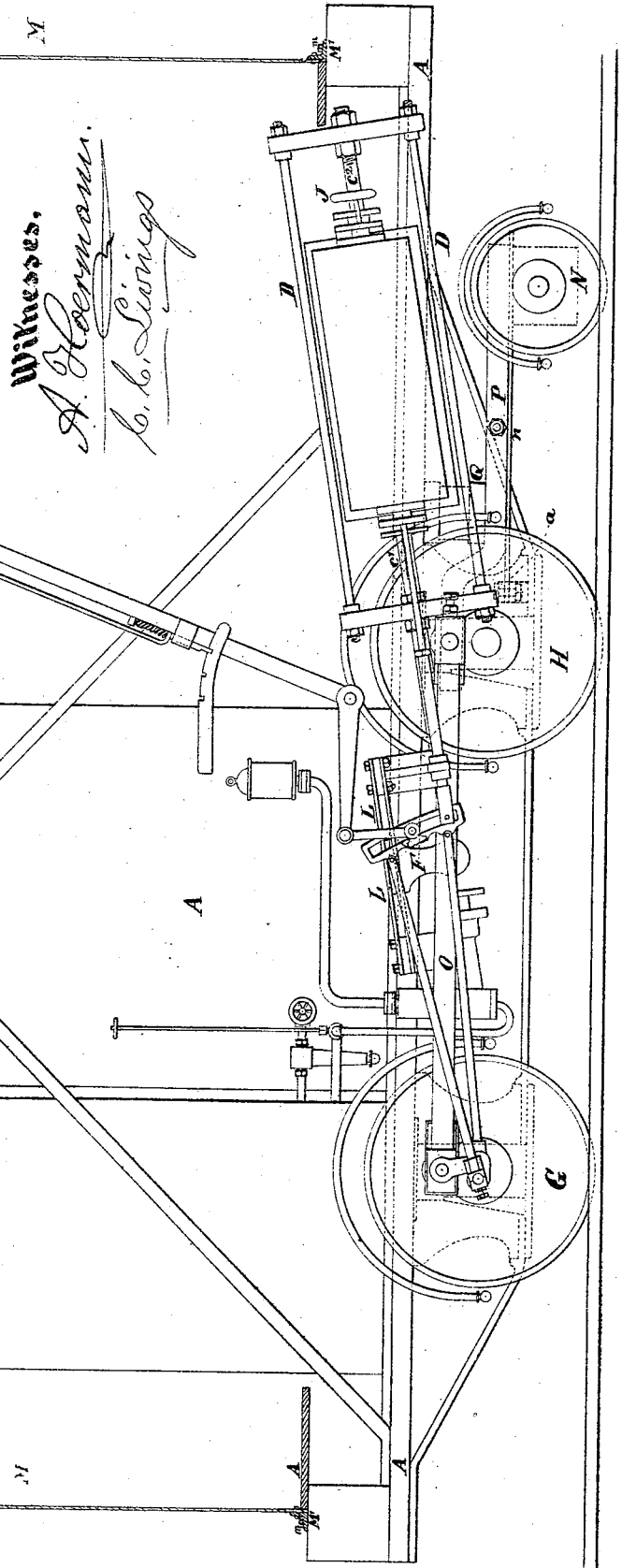
Figures 2, 3, 4, 5, 6:
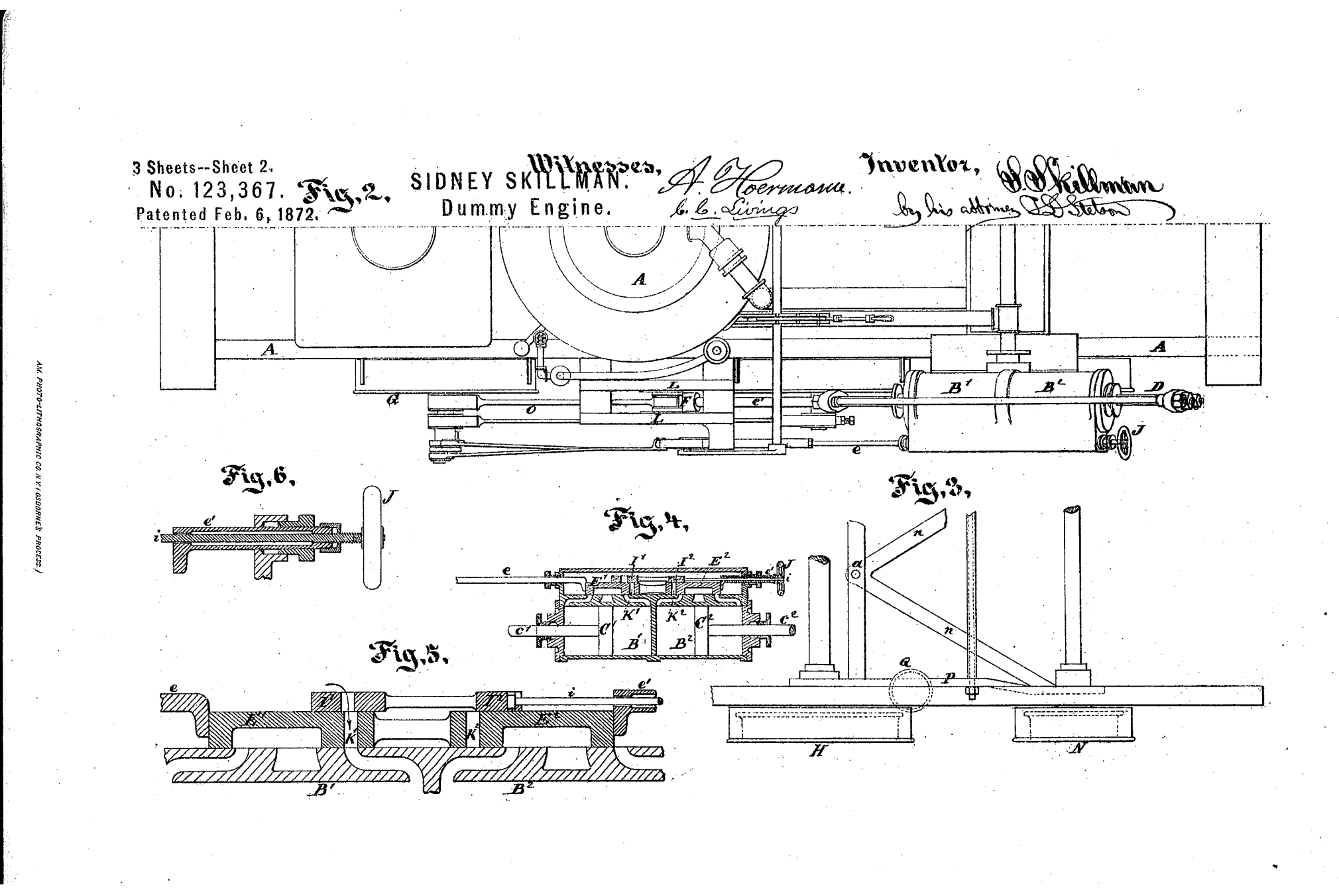

Figure 1 is a general side elevation. Fig. 2 is a plan view of a portion. Fig. 3 is a plan view of another portion, the latter being the lower portion at the front or right hand end; and Fig. 4 is a horizontal section through the cylinder on the left or further side of the machine, the cylinder and connections on this side being the same, but in the reversed position. Fig. 5 is a corresponding section of some of the same parts on a larger scale, and showing the parts differently adjusted. In Fig. 4 the engine will work with the steam acting with only half the effect which it will have in Fig. 5, the consumption of steam, of course, differing in about the same ratio. Fig. 6 is a larger view of certain other parts.

The remaining figures show certain features of my invention applied to a modified construction of a dummy.

Figure 7:
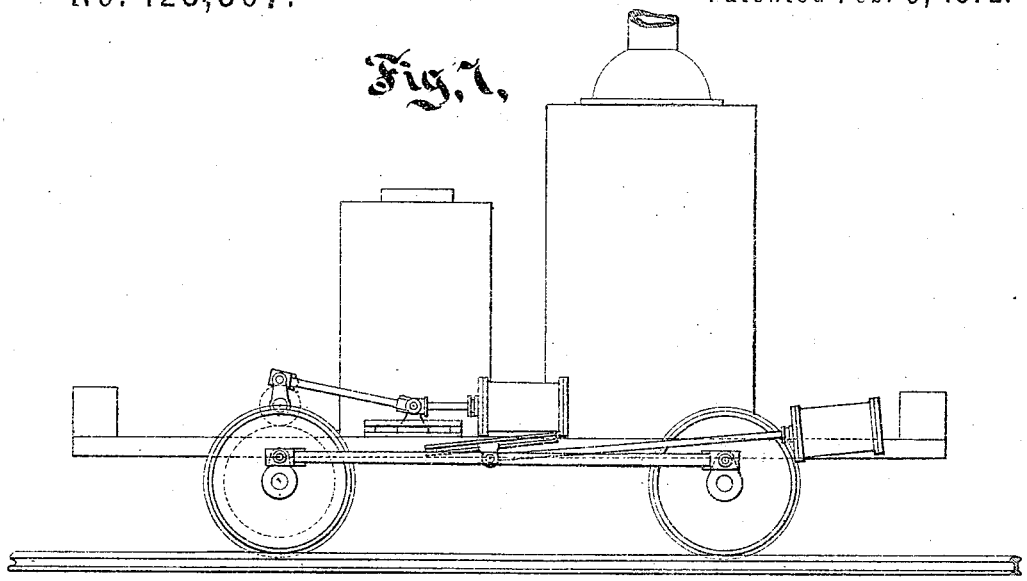
Figure 8:
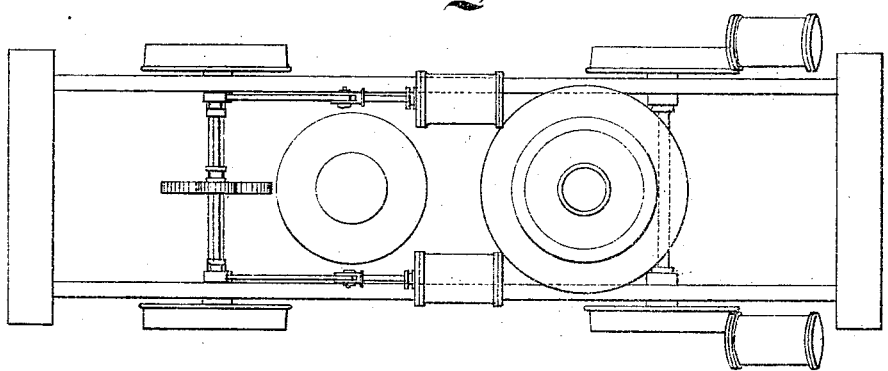
Figure 9:
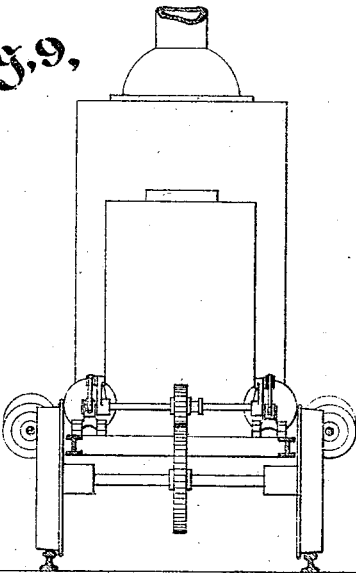

Fig. 7 is a side section; Fig. 8, a plan; and Fig. 9, an end view. These figures will explain themselves; and I propose to ask no attention to them except to present them as possible modifications.

The description refers to form shown in Figs. 1 to 6.

Similar letters of reference indicate corresponding parts in all the figures.

The drawing represents the novel parts, with much of the ordinary parts.

A is the fixed frame-work of the machine; and, to simplify the description, I will letter as a part of the frame-work the boiler, and, perhaps, some of the other ordinary fixed parts. I support the boiler and stiffen the frame-work at the same time by inclined braces, which make the boiler really a portion of the frame-work. There is nothing novel in the construction or use of the boiler, or in the transporting and introduction of the water, or in the manufacture of the steam. The cylinder is of about double the ordinary length, with a partition in the middle, which makes it, in effect, two cylinders placed end to end. There are two pistons, one for each part, and the piston-rods therefrom pass out through stuffing-boxes in the opposite ends of the duplex cylinder thus produced. They are connected by a frame outside, so that they are compelled to act together, and transmit their force to the mechanism through a single connecting-rod. The two ends of the cylinder are marked, respectively, $B^1$ and $B^2$. The corresponding pistons are marked $C^1$ $C^2$, and the piston-rods $c^1$ $c^2$. The frame which connects them is rectangular, and is denoted by D. There are two complete sets of parts and two slide-valves, marked, respectively, $E^1$ $E^2$. They are connected together so that they are both moved by a single valve-stem, $e$. The valves are inclosed in a single steam-chest, with a stuffing-box at each end. The stuffing-box at one end of the steam-chest allows the passage of the valve-stem $e$ in the ordinary manner. The stuffing-box at the opposite end of the steam-chest allows the passage of a hollow sleeve, which carries a threaded stem with a hand-wheel, by means of which a very important function is performed in controlling the action of the steam so that it shall act within the compound cylinder either as a single or as a double cylinder. The sleeve is marked $e^1$, and is fixed on the compound slide-valve so that it travels therewith. The inclosed stem is marked $i$, and connects to a compound valve or slide riding on the top of the compound slide $E^1 E^2$, and marked $I^1 I^2$. The stem $i$ is turned by a hand-wheel, J. The connection of the parts $I^1 I^2$ is rigid. The connection of the stem $i$ thereto allows the free turning of the stem, and the screw-thread upon the stem causes the turning of the hand-wheel J to move the compound valve $I^1 I^2$ backward or forward upon the compound slide $E^1 E^2$. There is one port or vertical opening through each of the parts $E^1 E^2$, which is covered or uncovered by the adjustment of the valves $I^1 I^2$. They are marked $K^1 K^2$.

When covered both are of no effect, and the steam works in the engine only at each end of the compound cylinder—that is to say, the steam acts against the left-hand side of the piston $C^1$, and then, for the return stroke, it acts against the right-hand side of the piston $C^2$, and there is a vacuum or only sufficient steam to lubricate on the other side of each piston. But when it is desired to work with more power, as in starting in a difficult position, or with other cars or carriages attached, or in climbing a steep grade, the engineer simply turns the hand-wheel J, which can be done without stopping the engine, so as to uncover the vertical openings $K^1 K^2$; and now the steam not only acts on one side of each piston, but, at the proper times, acts on each side of each piston. In other words, when the piston $C^1$ is pressed to the right by the admission of steam to its left side the piston $C^2$ is also pressed to the right by the admission of steam to its left side; and the same effect occurs in the reverse direction upon the return stroke, each part $B^1$ and $B^2$ of the compound cylinder now serving as a complete cylinder, receiving and discharging steam alternately at its opposite ends, so as to perform an effect as two complete cylinders.

I have not deemed it necessary to represent any of the many devices which I contemplate employing for admitting and maintaining a sufficient quantity of steam within the central portion of my compound cylinder, or within the unused ends of each single part when the dummy is performing in its ordinary condition with the ports $K^1 K^2$ closed. One is to allow a small opening to constantly admit steam, and to provide a liberal opening, controlled by a cock or the like, which will allow the steam to move freely around or past the central partition, so that the space once being filled with steam at the atmospheric or any other pressure it moves freely from one side to the other and is not discharged into the atmosphere. A very small aperture will allow sufficient ingress of steam to compensate for condensation and maintain the pressure under these conditions.

Some of the advantages due to certain features of the invention may be separately enumerated, as follows: First, by reason of the provisions J $I^1 I^2$ for making the engines work with their full capacity, or with only half their capacity, instantly at will; or, in other words, my employment of reserved power by using only one side or both sides of the pistons $C^1 C^2$ at will, I am able, by the same connections and the same drivers, and with little labor or time in adjustment, to develop extraordinary power for starting, and surmounting steep inclines, or plowing through snow-drifts or the like for short distances, and to run with economy on levels and descending grades. Second, by reason of the fact that the two pistons $C^1$ and $C^2$ work in the same compound cylinder $B^1$ and $B^2$, I am able to economize the weight and cost of the cylinder, and especially to economize the heat, so that there is less loss from radiation; and am able to easily provide for inclosing a quantity of low-pressure steam in the unused ends of the cylinder, and allow it to be exchanged from one side to the other of the central diaphragm for lubricating the surfaces.

I claim as my invention—

1. The provisions J $I^1 I^2$, or their equivalents, for conveniently admitting live steam to act at will on extra piston-faces for starting and ascending grades, to form a reserved power, when such power is connected to the same driving-wheels as are used for the ordinary power and acts therewith, substantially as set forth.

2. The specific arrangement of the duplicate cylinders $B^1$ and $B^2$ and their respective pistons in line with each other and close together, so as to furnish reserved power at will to the locomotive in cylinders heated and constantly prepared, as specified.

SIDNEY SKILLMAN.

Witnesses:
C. C. LIVINGS,
THOMAS D. STETSON.